Jan. 20, 1959  J. B. BEACH  2,869,806
AIRCRAFT LANDING GEAR
Filed Dec. 22, 1954  4 Sheets-Sheet 1
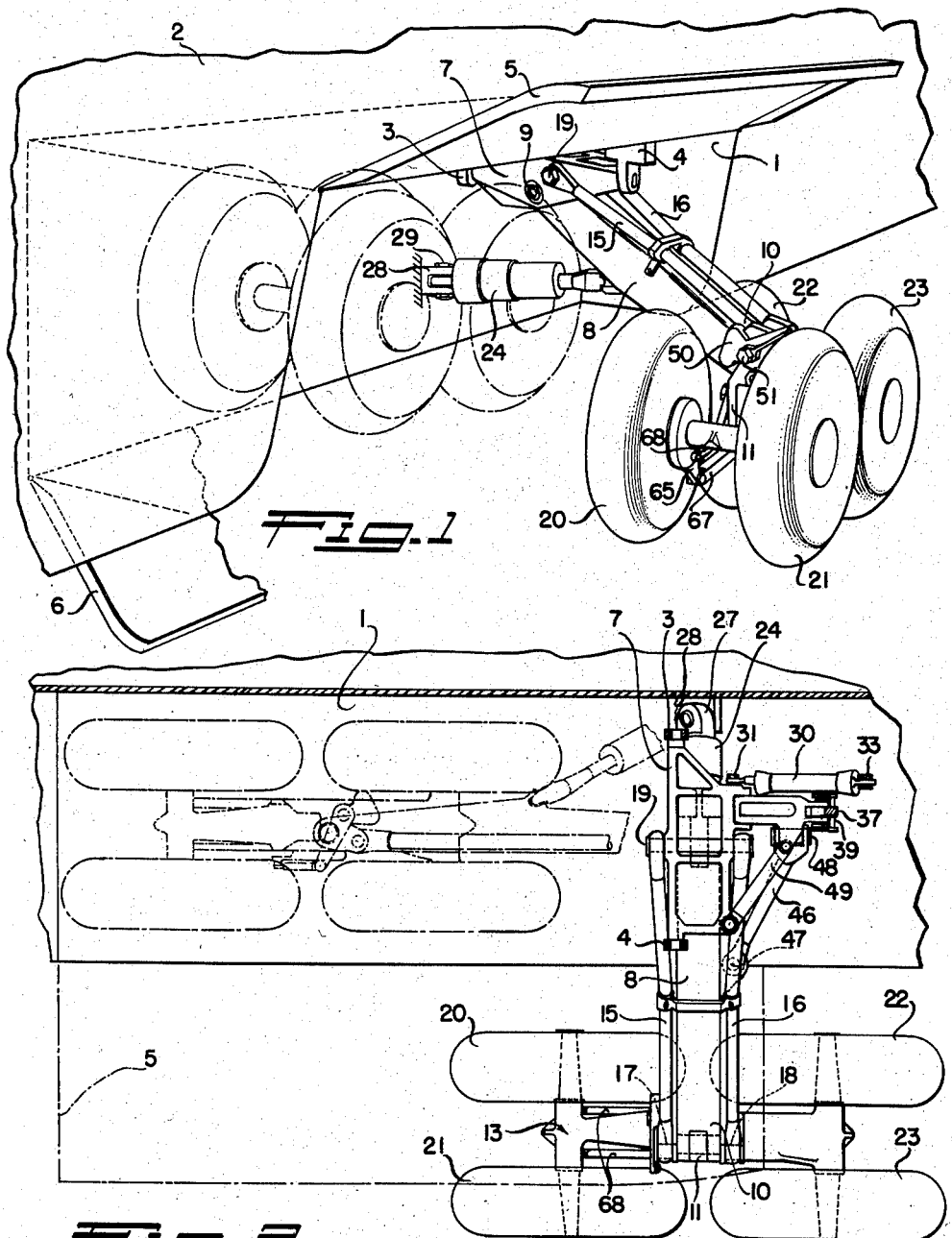
*INVENTOR.*
JAMES B. BEACH
BY
Agent Jan. 20, 1959

J. B. BEACH 2,869,806

AIRCRAFT LANDING GEAR

Filed Dec. 22, 1954

INVENTOR.
JAMES B. BEACH
BY
George C. Sullivan
Agent

Jan. 20, 1959 J. B. BEACH 2,869,806
AIRCRAFT LANDING GEAR
Filed Dec. 22, 1954 4 Sheets-Sheet 3

INVENTOR.
JAMES B. BEACH
BY
*George C. Sullivan*
Agent

Jan. 20, 1959  J. B. BEACH  2,869,806
AIRCRAFT LANDING GEAR
Filed Dec. 22, 1954  4 Sheets-Sheet 4
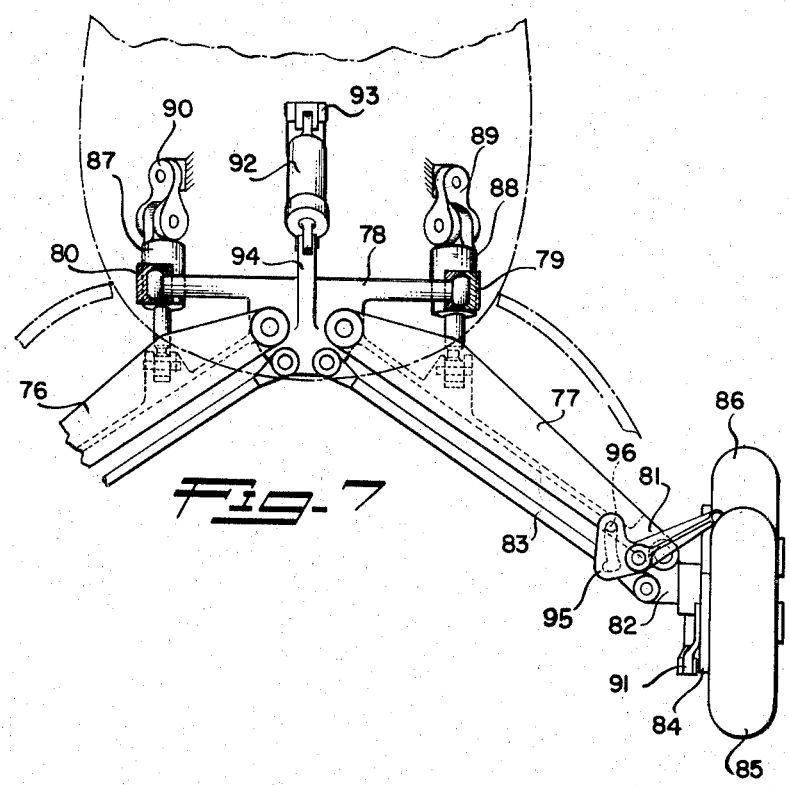
*INVENTOR.*
JAMES B. BEACH
BY
Agent

United States Patent Office 2,869,806
Patented Jan. 20, 1959

2,869,806

AIRCRAFT LANDING GEAR

James B. Beach, Van Nuys, Calif., assignor to Lockheed Aircraft Corporation, Burbank, Calif.

Application December 22, 1954, Serial No. 477,051

12 Claims. (Cl. 244—102)

This invention relates to aircraft landing gear and, more particularly, to one of the retractable type having a plurality of wheels which are carried on a bogie by a parallelogram linkage arrangement to provide a configuration furnishing excellent lateral stability for an aircraft even when the gear is attached to the fuselage at a location close to the center of gravity.

Conventional landing gear for aircraft employ an oleo member which is swingable for raising and lowering the gear. When the gear is extended, the oleo member must assume a nearly vertical position relative to the plane of the landing surface for absorbing the landing loads. With this conventional gear arrangement it is a practical necessity to either mount the main gear in the wing or employ auxiliary landing gear in the wing in order to provide sufficient lateral stability for the aircraft when on the ground.

The modern concept in aircraft design requires the use of thin wings which cannot efficiently accommodate the main landing gear structure since there is not sufficient space inside such wings for enclosing the gear when retracted. Thus the expedient of mounting the main gear in the fuselage of thin wing aircraft and employing small auxiliary landing gear in the outboard ends of the wings has been an accepted practice, it being recognized as the best solution heretofore available.

An object of this invention is to provide a retractable aircraft landing gear which may be mounted in the fuselage and which will, in the extended position, project downwardly and outwardly from its securing brackets to provide excellent lateral stability for the aircraft when on the ground; stability of the same order as that which is obtained by the use of conventional gear mounted in the wing.

Another object of this invention is to provide an aircraft landing gear of the retractable type which will accommodate a dual, tandem wheel arrangement for the efficient use of the gear on large transport aircraft.

Another object of this invention is to provide a landing gear having an arrangement of the various elements which will allow the gear to be retracted into a relatively small space and which, in the extended position, becomes an efficient load supporting structure.

Another object of this invention is to provide an aircraft landing gear which is dependable in operation and which employs a movable wheel carrying bogie guided by a cam arrangement to prevent structural interferences during extension and retraction of the gear and to maintain the bogie in the proper attitude for making ground contact. The cam arrangement includes means to allow movement of the bogie relative to the cam when the gear is loaded whereby normal pitching movement of the aircraft may occur without imposing abnormally high stresses on the gear.

Still another object of the invention is to provide an aircraft landing gear having a bogie type tandem wheel suspension system which includes compensating means for counterbalancing the upsetting moments created by applying braking action whereby the landing loads are uniformly distributed among the several wheels at all times.

Further and other objects will become apparent from a reading of the following detailed description, especially when considered in combination with the accompanying drawing wherein like numerals refer to like parts.

In the drawing:

Figure 1 is a fragmentary perspective view of a portion of an aircraft fuselage showing the landing gear of this invention secured thereto;

Figure 2 is a fragmentary top view showing the landing gear in both the extended and retracted positions;

Figure 7 is a fragmentary front view showing a modified form of the invention.

Figure 3:
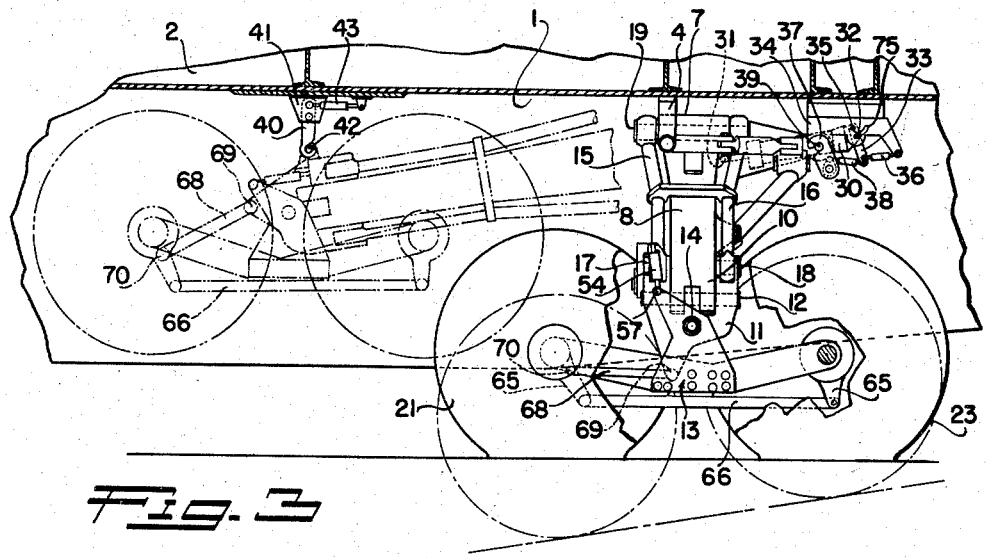
Figure 3 is a fragmentary side view showing the landing gear in both the extended and retracted positions.

With particular reference to Figure 1, it is seen that the landing gear is carried in a wheel-well or compartment 1 formed in the lower side of a fuselage 2 by a pair of spaced brackets 3 and 4 rigidly secured to the aircraft. Doors 5 and 6 are employed, as customary, for closing the landing gear compartment when the gear is in the retracted position to provide a low air drag fuselage configuration.

A bolster-like fulcrum fitting 7 is carried by brackets 3 and 4 to allow rotational movement of the fulcrum fitting about a transverse or spanwise axis relative to the aircraft longitudinal axis. A main beam 8 is swingably carried by fitting 7 through hinge pin 9 for swinging movement about an axis normal to the axis of rotation of the fitting. The free end 10 of beam 8 carries a knuckle fitting 11 through pin 12. A truck or bogie 13 is carried by knuckle fitting 11 through pin 14 whereby the bogie is free to swing about an axis normal to the aircraft longitudinal axis for the ordinary use of the gear and for gear extension and retraction movement, as hereinafter described in detail.

Knuckle fitting 11 is stablized through the use of a pair of arms 15 and 16 which connect at one end with knuckle fitting 11 through pins 17 and 18 and at their opposite ends to fulcrum fitting 7 through pin 19, completing a parallelogram linkage arrangement which, with the gear in the extended position, will allow swinging movement of main beam 8 and arms 15 and 16 relative to fulcrum fitting 7 as required for absorbing shock loads and, at the same time, always maintain knuckle fitting 11 in a substantially vertical plane. Main beam 8 and both arms 15 and 16 may together be considered simply as a pair of leg members in the parallelogram linkage which provide support for bogie 13. It is largely a matter of design choice whether arms 15 and 16 are constructioned as one or more parts.

Bogie 13, by way of example, is shown carrying four wheels 20, 21, 22 and 23 in a dual tandem arrangement wherein main beam 8 and arms 15 and 16 project above and between inner wheels 20 and 22 to engage the bogie carrying knuckle fitting 11. The parallelogram arrangement which effects translational movement of knuckle fitting 11 at all times when the gear is extended allows the load applied by the aircraft through the landing gear to be equally distributed to all four wheels even while the gear is moving to absorb the applied static and dynamic loads.

Figure 4:
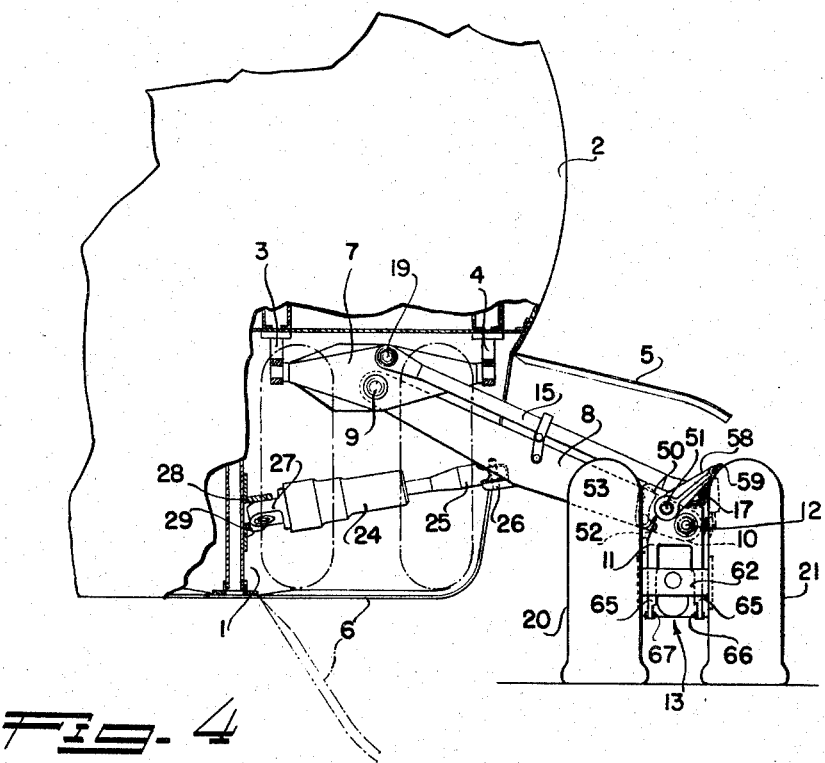
Figure 4 is a fragmentary front view of the landing gear.

The swinging movement of main beam 8 about pin 9 is controlled by a tension type shock absorber 24, as best shown in Figure 4, wherein one end of the shock absorber engages main beam 8 through pin 26 and the opposite end 27 of the shock absorber is swingably secured to bracket 28 in fuselage 2 through pin 29. Thus loads applied to the gear are partly transmitted to the fuselage through shock absorber 24 while the remaining portion of the load is transmitted to the fuselage through fulcrum fitting 7. Shock loads applied to the gear are dissipated in shock absorber 24 by axial movement of end 25 relative to end 27. The alignment of shock absorber supporting brackets 28 and 26 are such as to allow unrestrained movement of the landing gear between the retracted and extended positions along a selected path.

Shock absorber 24 may be of any suitable type such as hydraulic or mechanical. It may also be the fixed length type since the desired path for movement of the gear between the expanded and retracted positions is obtained by proper arrangement of the pivot points rather than by varying the length of the shock absorber strut. There are several versions of these basic types presently available on the open market which would be entirely satisfactory.

Movement of the landing gear between the retracted and the extended positions is accomplished as best shown in Figures 2 and 3 by simply rotating fulcrum fitting 7 about its axis. The arrangement of the various pivot points on the landing gear will automatically effect gear movement along a fixed path, causing the gear to move from and to the retracted or stowed position illustrated in the drawing. The controlled movement of fulcrum fitting 7 is effected by an actuating cylinder 30 which connects with fulcrum fitting 7 through pin 31 and with the aircraft structure through pin 32 and lever 33. One end of lever 33 is swingably carried by bracket 34 on the aircraft through pin 35. Thus the initial movement of actuating cylinder 30 to effect retraction of the landing gear will cause rotation of lever 33 in the counter-clockwise direction, as viewed in Figure 3, within the limits of a cam-like slot 75 in which pin 32 rides. This limited counter-clockwise movement of lever 33 effects movement of downlock latch 37 through a bell-crank lever arrangement 38 carried by bracket 34. Such rotational movement of latch 37 releases a pin 39 on the gear and allows rotation of fulcrum fitting 7 to a gear retracted position through the continued operation of actuating cylinder 30. When the gear reaches the fully retracted position an uplock latch 40 swingably carried by bracket 41 on fuselage 2, as best shown in Figure 3, automatically engages a pin 42 on main beam 8 and secures the gear in the stowed position, relieving actuating cylinder 30.

Uplock latch 40 engages a suitable actuator such as cylinder 43 carried by fuselage 2 whereby rotation of latch 40 for releasing the gear may be effected remotely, allowing the latter to move to the extended position by the operation of actuating cylinder 30 as assisted by the force of gravity. Actuation of cylinder 30 to extend the gear effects clockwise rotation of lever 33, as viewed in Figure 3, which automatically actuates the downlock latch 37 to secure the gear in the fully extended position. A single action spring 36 which acts between lever 33 and bracket 34 serves to assist the actuating cylinder in moving latch 37 into the gear locking position. As is apparent from the drawing, the landing gear construction is such that landing loads actually urge the gear into the down position whereby the downlock mechanism serves primarily a safety function.

When raising and lowering the landing gear it is necessary to control the movement of bogie 13 in order to avoid interference between the wheels and main beam 8.

Figure 5:
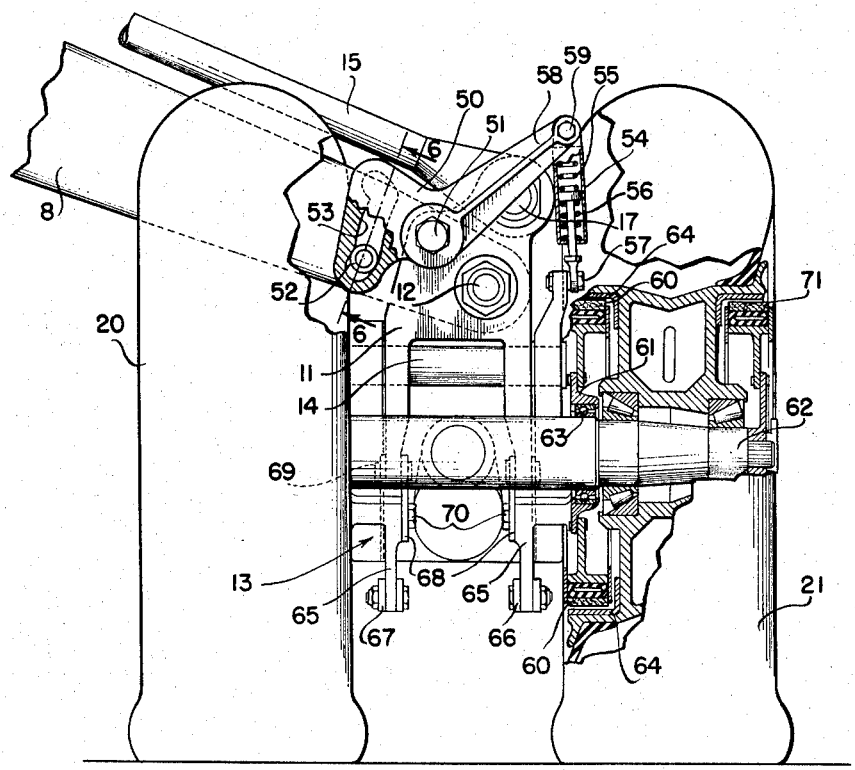
Figure 5 is an enlarged fragmentary front view showing the bogie and related structural elements of the landing gear.
Figure 6:
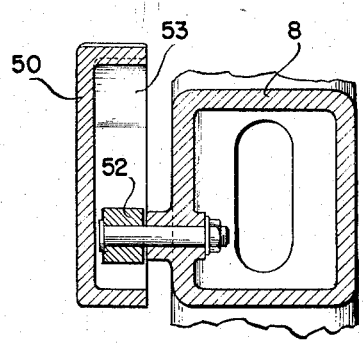
Figure 6 is a sectional view taken approximately on line 6—6 of Figure 5.

This control over the swinging movement of bogie 13 about its connecting pin 14 must also position the bogie so that ground contact will be made substantially simultaneously by all the wheels as well as permit sufficient swinging movement of the bogie after making ground contact to compensate for rough landing surfaces and for normal pitching movements of the aircraft. This is accomplished as best shown in Figures 5 and 6 by a cam 50 in combination with a bungee spring 54. Cam 50 is swingably carried on knuckle fitting 11 through pin 51 for engaging a cam follower 52 secured to main beam 8 adjacent the knuckle fitting. Groove 53 in cam 50 is shaped to provide the proper cam movement during retraction and extension of the gear in response to swinging movement of main beam 8 relative to fulcrum fitting 7. The parallelogram linkage arrangement of the gear which maintains knuckle fitting 11 in a substantially vertical position when the gear is extended also produces the relative movement necessary between the cam and main beam 8 to effect control over the movement of bogie 13. Cam movement is transmitted to the bogie through double action bungee spring 54, one end of which engages bogie 13 through pin 57 and the opposite end connects with arm 58 on cam 50 through pin 59. Bungee 54 is sufficiently strong to effectively transmit the movement of cam 50 to bogie 13 without compressing either of the pre-loaded bungee springs 55 and 56 only when no landing loads are being applied to the gear. Hence, by properly shaping cam groove 53, the desired movement of bogie 13 may be effected during extension and retraction of the gear to prevent structural interferences while allowing bogie movement about pin 14 to allow for rough landging surfaces and normal pitching movements of the aircraft. Obviously bungee spring 54 may be of any suitable type such as mechanical or hydraulic, the only requirements are that it be double acting and that it maintain sufficient pre-load to serve as a fixed link while the gear is being raised or lowered.

The landing gear construction wherein the wheels are arranged in tandem on a swingable bogie 13 makes it necessary to use some means for transmitting the moments produced by applying the brakes into the aircraft structure without tending to cause rotation of the bogie. That is, if the moments produced by the braking force are not balanced out by an equal and opposite moment, bogie 13 will tend to rotate about pin 14 and cause the forward set of wheels 20 and 21 to absorb an excessively large portion of the landing loads. Means are therefore provided to prevent such action, as is most clearly shown in Figures 3 and 5. The inner brake shoes 60 of each wheel are secured to a rotatable plate 61 carried by its associated axle 62 through suitable bearings 63. Thus when brake shoe 60 is forced tightly against brake drum 64, plate 61 is urged to rotate with the wheel. Such rotation is prevented, however, by a lever arrangement which connects the movable brake shoe supporting plates 61 on each wheel 20, 21, 22 and 23 with knuckle fitting 11. As shown in the drawing, plate 61 for each wheel is provided with laterally and downwardly projecting levers 65 which are rigidly secured to the plate. A rod 66 connects brake shoe plate arm 65 on wheel 23 with the brake shoe plate arm on wheel 21 while rod 67 connects the brake shoe plate arm on wheel 22 with the brake shoe plate arm on wheel 20 whereby rotation of the inner brake shoe plates on the rear wheels 22 and 23 are transmitted to the inner brake shoe plates on wheels 20 and 21. Rods 68, which are carried on knuckle fitting 11 through pins 69 connect with brake shoe plate arms 65 on wheels 20 and 21 through pins 70 to transmit the rotational forces of the brake shoe plates directly into the knuckle fitting. The location of the pivot points for rods 66 and 67, as well as for rods 68, are selected to produce a counterbalancing moment about pin 14 connecting the bogie with knuckle fitting 11 which is equal and opposite in direction to the moment produced by the braking action applied through wheels 20, 21, 22 and 23. Therefore, when the brakes are applied there is no tendency for the bogie to rotate about pin 14 and the landing gear load will be distributed equally among all four wheels even when the brakes are being applied.

As indicated in Figure 5, each wheel is also provided with outer brake shoes 71 which are rigidly secured to their associated axle 62 whereby the moments produced by applying a braking force through the outer shoes is applied directly to the bogie. This, however, is taken into account in determining the location of the pivot points for the linkage arrangement defined by arms 65 and rods 66, 67 and 68 so that the total moment produced by braking is balanced by the moment applied by the knuckle fitting through rods 68. By connecting the compensating linkage to only the inner brake shoe plates a simplification of the compensating mechanism results and at the same time the braking force is applied symmetrically to each wheel. Obviously the particular type of brake employed on the gear is of but minor importance to the invention. A double drum brake is shown and described herein only because it is believed to permit a more thorough understanding of the operation of the compensating linkage in balancing the braking moments.

In operation, the gear is held in the up position, as shown in dotted lines in Figure 3, by uplock latch 40 which provides a simple and dependable means for maintaining the gear in the stowed position during flight without depending entirely upon the use of actuating cylinder 30.

To lower the landing gear, cylinder 43 of the uplock mechanism is suitably energized, causing latch 40 to disengage pin 42 on the landing gear structure. Actuating cylinder 30 is then energized, causing fulcrum fitting 7 to be rotated in a counterclockwise direction, as viewed in Figure 3, until the gear is moved to the fully extended position wherein additional movement of actuating cylinder 30 will automatically actuate the downlock mechanism causing latch 37 on fuselage bracket 34 to engage pin 39 on the fulcrum fitting and lock the gear in the down position.

As the gear is being lowered, cam member 50 causes bogie 13 to assume an attitude which will avoid structural interference between the wheels and beam 8. By the time the gear reaches the extended position, cam member 50 will have moved bogie 13 into an attitude which will allow all four wheels to engage the ground simultaneously in a normal landing whereby the initial load is evenly distributed among the several wheels.

Door 5 on fuselage 2 remains open while the gear is extended, however, door 6 is opened only during the raising and lowering of the gear. This is done in accordance with the general practice to minimize the drag produced by the open wheel-well.

While the aircraft is on the ground, swinging movement of bogie 13 about pin 14 is permitted by bungee spring 54 to allow normal pitching movement of the aircraft and to maintain the load evenly distributed among the plurality of wheels, even when taking off or landing from rough ground.

Any tendency for the bogie to rotate due to applying the brakes is eliminated by the moment compensating linkage connecting the inner brake shoe supporting plates with the knuckle fitting.

Retraction of the landing gear into the wheel-well is accomplished by actuation of cylinder 30 which automatically releases the downlock mechanism and effects clockwise rotation of fulcrum fitting 7, as viewed in Figure 3, until uplock latch 40 engages pin 42 at which time the gear is secured in the stowed position, allowing doors 5 and 6 to be closed to provide a low drag fuselage configuration during flight.

Figure 7 illustrates a modified form of the landing gear shown in Figures 1 through 6 wherein both the left and right hand wheel suspension beams 76 and 77 are carried by a common fulcrum fitting 78. The fulcrum fitting, like its counterpart in the first version, is swingably carried by the aircraft through suitable brackets 79 and 80 for movement about a horizontal or spanwise axis generally normal to the aircraft longitudinal axis. The free end 81 of each wheel suspension beam 76 and 77 pivotally engages a knuckle fitting 82 which, with arm 83, completes a parallelogram linkage arrangement allowing only translational movement of the knuckle fitting in response to swinging movement of the associated beam 76 or 77 relative to fulcrum fitting 78. A bogie 84 is swingably carried by each knuckle fitting 82 for movement about a horizontal axis normal to the aircraft longitudinal axis whereby wheels 85 and 86, arranged in tandem on the bogie, may be positioned to allow proper gear operation at all times.

Compression type shock absorbers 87 and 88 are pivotally carried by the aircraft through brackets 89 and 90 to swingably engage wheel suspension beams 76 and 77 and establish a fixed path for the movement thereof between an extended position and a retracted position. With the landing gear in the extended position, suspension beams 76 and 77 project laterally outwardly and downwardly and are allowed to swing relative to fulcrum fitting 78 as the landing loads are applied to shock absorbers 87 and 88.

A cam member 95, carried on knuckle fitting 82, engages a cam follower pin 96 on suspension beam 76 or 77 for controlling the swinging movement of the bogie in a manner similar to that described hereinabove in connection with the gear of Figures 1 through 6.

The moments produced by applying a braking force through wheels 85 and 86 are transmitted directly into knuckle fitting 82 through the use of a compensating lever arrangement 91 which is the equivalent of the compensating linkage previously described for equally distributing the landing loads between the wheels at all times.

Raising and lowering of both the left and right hand gear in the version shown in Figure 7 may be accomplished by a single actuating cylinder 92 which is suitably secured at one end to aircraft structure 93 and at the opposite end to an arm 94 on fulcrum fitting 78.

Any suitable means, such as that shown in Figures 2 and 3, may be employed in conjunction with actuating cylinder 92 for locking the gear in the retracted and extended positions.

The landing gear configuration shown in Figure 7 is particularly well suited for use on smaller aircraft though obviously it is not limited to such use. The arrangement whereby only one actuating cylinder is employed for raising and lowering both the left and right hand gear not only provides a design simplification but also insures that both gears will be raised and lowered simultaneously, thus avoiding the possibility of producing unsymmetrical aerodynamic loads on the aircraft.

It is to be understood that certain alterations, modifications and substitutions may be made to the instant disclosure without departing from the spirit and scope of this invention as defined by the appended claims.

I claim:

1. A retractable landing gear for aircraft comprising, a fulcrum fitting swingably carried by the aircraft, a pair of leg members swingably carried by said fulcrum fitting for movement about an axis normal to the axis of rotation of the fulcrum fitting, a knuckle fitting swingably carried by the free ends of the pair of leg members whereby a parallelogram linkage is completed allowing only translational movement of the knuckle fitting in response to limited swinging movement of said leg members relative to said fulcrum fitting, a shock absorber connecting with the aircraft and with one leg of said pair of leg members for stabilizing the latter and causing it to follow a selected path from a stowed position to an extended position in response to rotation of said fulcrum fitting, a bogie swingably carried by said knuckle fitting for movement about an axis generally parallel with the axis of rotation of said fulcrum fitting, a plurality of wheels arranged in tandem and carried on said bogie, cam means carried on said knuckle fitting, cam follower means carried on one leg of said pair of leg members and operatively engaging said cam means for controlling the movement thereof in response to swinging movement of said pair of leg members, preloaded double acting spring means connecting said cam means with said bogie and serving as a rigid mechanical link during extension and retraction of the gear to position the bogie as directed by said cam means to avoid structural interference between the pair of leg members and said bogie, said double acting spring means being operable in response to external loads applied to said gear for allowing swinging movement of said bogie relative to said cam means, brake means carried by said bogie, and moment compensating linkage means connecting with said brake means and with said knuckle fitting for counterbalancing the moments produced by applying a braking force through the plurality of wheels whereby landing loads are evenly distributed therebetween.

2. A retractable landing gear for aircraft having a fuselage and a wheel-well formed in the side thereof comprising, a fulcrum fitting swingably carried by said aircraft within said wheel-well for movement about an axis generally normal to the aircraft longitudinal axis, a pair of leg members swingably carried by said fulcrum fitting for movement about an axis generally normal to the axis of rotation of the fulcrum fitting, a knuckle fitting connecting with the free ends of said pair of leg members and completing a parallelogram linkage arrangement allowing only translational movement of said knuckle fitting in response to swinging movement of said pair of leg members relative to said fulcrum fitting, shock absorbing means acting between said aircraft and said leg members for stabilizing the latter and establishing a fixed path for movement of said leg members between a stowed position within said wheel-well and an extended position projecting laterally outwardly and downwardly from said wheel-well, as effected by rotating said fulcrum fitting, a bogie swingably carried by said knuckle fitting, a plurality of wheels carried by said bogie for supporting the aircraft, cam means carried on said knuckle fitting and engaging said bogie and controlling the swinging movement thereof to avoid structural interferences between the leg members and the wheels during retraction and extension of the gear, and moment compensating means connecting with at least one of said wheels and with said knuckle fitting for transmitting the moments produced by applying a braking force through the wheels directly into said knuckle fitting whereby to avoid an uneven weight distribution among the plurality of wheels.

3. A retractable landing gear for aircraft having a fuselage and a wheel-well formed in the wall thereof comprising, a fulcrum fitting swingably carried by said aircraft within said wheel-well for movement about an axis generally normal to the aircraft longitudinal axis, a pair of leg members swingably carried by said fulcrum fitting for movement about an axis generally normal to the axis of rotation of the fulcrum fitting, a knuckle fitting connecting with the free ends of said pair of leg members and completing a parallelogram linkage arrangement allowing only translational movement of said knuckle fitting in response to swinging movement of said pair of leg members relative to said fulcrum fitting, shock absorbing means acting between said aircraft and said leg members for stabilizing the latter and establishing a fixed path for the movement of said leg members between a stowed position within said wheel-well and an extended position projecting laterally outwardly and downwardly from said wheel-well, actuating means connecting with said aircraft and with said fulcrum fitting for effecting rotation of the latter whereby to raise and lower the landing gear, a bogie swingably carried by said knuckle fitting, a plurality of wheels carried by said bogie for engaging a landing surface and supporting said aircraft when said leg members are in the extended position, control means acting between said knuckle fitting and said bogie and effectively positioning the latter relative to the knuckle fitting only in the absence of an external load applied thereto of predetermined magnitude for avoiding structural interferences between said wheels and said leg members when retracting or extending the gear, and means responsive to said actuating means for automatically locking said gear in the extended position.

4. A retractable landing gear for aircraft having a fuselage and a wheel-well formed in the wall thereof comprising, a fulcrum fitting swingably carried by said aircraft within said wheel-well for movement about an axis generally normal to the aircraft longitudinal axis, a pair of leg members swingably carried by said fulcrum fitting for movement about an axis generally normal to the axis of rotation of the fulcrum fitting, a knuckle fitting connecting with the free ends of said pair of leg members and completing a parallelogram linkage arrangement allowing only translational movement of said knuckle fitting in response to swinging movement of said pair of leg members relative to said fulcrum fitting, shock absorbing means acting between said aircraft and said leg members for stabilizing the latter and establishing a fixed path for the movement of said leg members between a stowed position within said wheel-well and an extended position projecting laterally outwardly and downwardly from said wheel-well, actuating means connecting with said aircraft and with said fulcrum fitting for effecting rotation of the latter whereby to raise and lower the landing gear, a bogie swingably carried by said knuckle fitting, a plurality of wheels carried by said bogie for engaging a landing surface and supporting said aircraft when said leg members are in the extended position, control means acting between said knuckle fitting and said bogie and effectively positioning the latter relative to the knuckle fitting only in the absence of an external load applied thereto of predetermined magnitude for avoiding structural interferences between said wheels and said leg members when retracting or extending the gear, moment compensating means connecting with said wheels and with said knuckle fitting for transmitting the moments produced by applying a braking force directly into said knuckle fitting whereby to avoid an uneven weight distribution among the plurality of wheels, and means responsive to said actuating means for automatically locking said gear in the extended position.

5. A retractable landing gear for aircraft comprising, a parallelogram linkage arrangement swingably carried by said aircraft for movement in two mutually perpendicular planes, shock absorbing means connecting with said aircraft and with said linkage arrangement for stabilizing the latter and establishing a fixed path for the movement thereof between a stowed position and an extended position, a bogie swingable carried by said linkage arrangement at the free end thereof for movement about an axis generally normal to the longitudinal axis of said aircraft, a plurality of wheels carried by said bogie for engaging a landing surface and supporting said aircraft when said linkage arrangement is in the extended position, control means acting between said linkage arrangement and said bogie and effectively positioning the latter relative to the linkage arrangement only in the absence of an external load applied thereto of predetermined magnitude for avoiding structural interferences between said wheels and said linkage arrangement when being retracted or extended, moment compensating means connecting with said wheels and said linkage arrangement for balancing the moments tending to cause rotation of said bogie whereby loads applied to said landing gear are equally distributed among the plurality of wheels, and actuating means acting between said aircraft and said linkage arrangement for effecting rotation of the latter in one plane whereby to raise and lower the landing gear.

6. A retractable landing gear for aircraft comprising, a parallelogram linkage arrangement swingably carried by said aircraft for movement about a fulcrum axis generally normal to the longitudinal axis of the aircraft and about a linkage axis generally parallel with the longitudinal axis of the aircraft, shock absorbing means connecting with said aircraft and with said linkage arrangement and stabilizing the latter against free movement about the linkage axis and establishing a fixed path for the movement thereof between a stowed position and an extended position, a bogie swingably carried by said linkage arrangement at the free end thereof for movement about a third axis generally parallel with said fulcrum axis, a plurality of wheels carried by said bogie for engaging a landing surface and supporting said aircraft when said linkage arrangement is in the extended position, control means acting between said linkage arrangement and said bogie and controllably moving the latter about said third axis relative to the linkage arrangement only in the absence of an external load applied thereto of predetermined magnitude for avoiding structural interferences between said wheels and said linkage arrangement when being retracted or extended, and actuating means acting between said aircraft and said linkage arrangement for controlling rotation of the latter about said fulcrum axis whereby to extend and retract the landing gear.

7. A retractable landing gear for aircraft comprising, a parallelogram linkage arrangement swingably carried by said aircraft for movement about a fulcrum axis generally normal to the longitudinal axis of the aircraft and about a linkage axis generally parallel with the longitudinal axis of the aircraft, shock absorbing means having a substantially fixed length connecting with said aircraft and with said linkage arrangement and stabilizing the latter against free movement about the linkage axis and establishing a fixed path for the movement thereof between a stowed position and an extended position, a bogie swingably carried by said linkage arrangement at the free end thereof for movement about a third axis generally parallel with said fulcrum axis, a plurality of wheels carried by said bogie for engaging a landing surface and supporting said aircraft when said linkage arrangement is in the extended position, control means acting between said linkage arrangement and said bogie and controllably moving the latter about said third axis relative to the linkage arrangement only in the absence of an external load applied thereto of predetermined magnitude for avoiding structural interferences between said wheels and said linkage arrangement when the gear is being retracted or extended, brake means carried on said bogie and associated with each said wheel, the brake means associated with at least one of said wheels being freely rotatable on said bogie, lever means connecting the rotatable brake means with said parallelogram linkage arrangement to provide a compensating moment counterbalancing the total moment produced by braking the plurality of wheels whereby to eliminate any tendency for said bogie to tilt and unevenly distribute the load through said wheels, and actuating means acting between said aircraft and said linkage arrangement and controlling rotation of the latter about said fulcrum axis for raising and lowering the landing gear.

8. A retractable landing gear for aircraft comprising, a parallelogram linkage swingably carried by said aircraft for independent movement about a fulcrum axis generally normal to the longitudinal axis of the aircraft and about a linkage axis generally parallel with the longitudinal axis of the aircraft, a shock absorber strut swingably connecting directly with said aircraft and with said linkage and stabilizing the latter and establishing a fixed path for the movement thereof between a stowed position and an extended position projecting generally downwardly and outwardly from the aircraft relative to the stowed position, said shock absorber strut having a fixed length for extension and retraction of the gear whereby the path of movement of the gear is determined by the geometrical relationship between the shock absorber and the parallelogram linkage, wheel means carried by the free end of said linkage for engaging a landing surface and supporting the aircraft when the linkage is in the extended position, actuating means carried by said aircraft and engaging said linkage for effecting rotation thereof about said fulcrum axis whereby to raise and lower the landing gear, and latch means carried by the aircraft and being responsive to the operation of said actuating means for automatically holding said gear in the extended position.

9. A retractable landing gear for aircraft comprising, a fulcrum fitting swingably carried by the aircraft, a pair of leg members swingably carried by said fulcrum fitting for movement about an axis normal to the axis of rotation of the fulcrum fitting, a knuckle fitting swingably carried by the free ends of the pair of leg members whereby a parallelogram linkage is completed allowing only translational movement of the knuckle fitting in response to limited swinging movement of said leg members relative to said fulcrum fitting, a shock absorber connecting directly with the aircraft and with one leg of said pair of leg members for stabilizing the latter and causing them to follow a select path between a stowed position and an extended position solely in response to rotation of said fulcrum fitting, said shock absorber having a fixed length for extension and retraction of the gear whereby the path of movement of the gear is determined by the geometrical relationship between the shock absorber and the leg members, wheel means carried by said knuckle fitting for engaging a landing surface and supporting the aircraft when said leg members are in the extended position, a bracket secured to said aircraft, said bracket having a slot formed therein, actuating means engaging said slot to permit only limited relative movement between the actuating means and said bracket, said actuating means connecting with said fulcrum fitting for effecting rotation thereof whereby to raise and lower the landing gear, and lever means carried by the aircraft and being responsive to the limited relative movement between the actuating means and said bracket in one direction to automatically engage said fulcrum fitting and lock said gear in the extended position and to limited relative movement between the actuating means and said bracket in the other direction to automatically release said fulcrum fitting for retracting the gear.

10. A retractable landing gear for aircraft comprising, a fulcrum fitting swingably carried by the aircraft for movement about a spanwise axis generally normal to the aircraft longitudinal axis, a pair of parallelogram linkages swingably carried by said fulcrum fitting for movement about an axis normal to the axis of rotation of the fulcrum fitting, shock absorbing means connecting with said aircraft and with said linkages for stabilizing the latter and establishing fixed paths for the symmetrical movement thereof between a stowed position and an extended position on opposite sides of the aircraft, a bogie swingably carried by each said linkage arrangement at the free ends thereof for movement about a horizontal axis generally normal to the longitudinal axis of the aircraft, a plurality of wheels carried by the bogies for engaging a landing surface and supporting said aircraft when said linkages are in the extended position, control means acting between each said linkage arrangement and its associated bogie and effectively positioning the latter relative to the linkage only in the absence of an external load applied to the bogie of predetermined magnitude for avoiding structural interferences between said wheels and said linkage arrangement when the latter is being retracted or extended, moment compensating means connecting with said wheels and said linkages for balancing the moment tending to cause rotation of the associated bogie whereby loads applied to said landing gear are equally distributed among the plurality of wheels, and actuating means acting between said aircraft and said fulcrum fitting for effecting rotation of the latter whereby to raise and lower the landing gear.

11. A retractable landing gear for aircraft comprising, a pair of wheel supporting parallelogram linkages, a common fulcrum fitting swingably carried by the aircraft for movement about an axis normal to the aircraft longitudinal axis and supportingly engaging both said parallelogram linkages and allowing movement thereof about an axis normal to the axis of rotation of the fulcrum fitting, shock absorbing means connecting directly with said aircraft and with said pair of parallelogram linkages and stabilizing the latter relative to said fulcrum fitting and establishing a fixed path for the movement thereof between a stowed position and an extended position projecting downwardly and outwardly on either side of the aircraft relative to the stowed position, said shock absorbing means providing a fixed length strut for extension and retraction of the gear whereby the path of movement of the gear is defined by the geometrical relationship between the shock absorbing means and the parallelogram linkages, and actuating means carried by said aircraft and connecting with said fulcrum fitting for effecting rotation thereof to raise and lower said landing gear.

12. A retractable landing gear for aircraft comprising, a parallelogram linkage swingably carried by said aircraft for independent movement about a fulcrum axis generally normal to the longitudinal axis of the aircraft and about a linkage axis generally parallel with the longitudinal axis of the aircraft, shock absorbing means connecting directly with said aircraft and with said linkage and stabilizing the latter with respect to movement about the linkage axis and establishing a fixed path for the movement thereof between a stowed position and an extended position projecting generally downwardly and outwardly from the aircraft relative to the stowed position, said shock absorbing means providing a fixed length strut for extension and retraction of the gear whereby the path of movement of the gear is defined by the geometrical relationship between the shock absorbing means and the parallelogram linkage, wheel means carried by the free end of said linkage for engaging a landing surface and supporting the aircraft when the linkage is in the extended position, and actuating means carried by said aircraft and engaging said linkage for effecting rotation thereof about said fulcrum axis whereby to raise and lower the landing gear.

References Cited in the file of this patent

UNITED STATES PATENTS

| | | |
|---|---|---|
| 2,146,955 | Helms | Feb. 14, 1939 |
| 2,280,185 | Bridges | Apr. 21, 1942 |
| 2,392,892 | Ward | Jan. 15, 1946 |
| 2,578,200 | Nicholl | Dec. 11, 1951 |

FOREIGN PATENTS

| | | |
|---|---|---|
| 50,907 | France | Feb. 4, 1941 |
| | (Addition to No. 851,294) | |
| 651,149 | Great Britain | Mar. 14, 1951 |
| 658,195 | Great Britain | Oct. 3, 1951 |
| 851,294 | France | Oct. 2, 1939 |